(12) United States Patent
Kulick, III et al.

(10) Patent No.: US 7,731,842 B2
(45) Date of Patent: Jun. 8, 2010

(54) SUBMERGED FIXED FILM ANOXIC BIOREACTOR

(75) Inventors: Frank M Kulick, III, Sinking Spring, PA (US); Curtis S McDowell, Allentown, PA (US)

(73) Assignee: Brentwood Industries, Inc., Reading, PA (US)

( * ) Notice: Subject to any disclaimer, the term of this patent is extended or adjusted under 35 U.S.C. 154(b) by 215 days.

(21) Appl. No.: 11/857,566

(22) Filed: Sep. 19, 2007

(65) Prior Publication Data

US 2009/0071900 A1 Mar. 19, 2009

(51) Int. Cl.
*C02F 3/06* (2006.01)

(52) U.S. Cl. .................. 210/151; 210/220; 210/259; 210/903

(58) Field of Classification Search .................. 210/150, 210/151, 220, 221.1, 221.2, 252, 259, 903, 210/908
See application file for complete search history.

(56) References Cited

U.S. PATENT DOCUMENTS

| | | | | |
|---|---|---|---|---|
| 4,056,465 A | * | 11/1977 | Spector | 210/605 |
| 4,442,005 A | * | 4/1984 | Breider | 210/614 |
| 4,599,174 A | | 7/1986 | McDowell | |
| 4,915,841 A | * | 4/1990 | Lagana' et al. | 210/605 |
| 5,156,742 A | * | 10/1992 | Struewing | 210/605 |
| 5,192,442 A | * | 3/1993 | Piccirillo et al. | 210/605 |
| 5,733,455 A | * | 3/1998 | Molof et al. | 210/605 |
| 6,054,044 A | * | 4/2000 | Hoffland et al. | 210/96.1 |

* cited by examiner

*Primary Examiner*—Fred Prince
(74) *Attorney, Agent, or Firm*—Miller Law Group, PLLC

(57) ABSTRACT

A constant velocity serpentine anoxic reactor incorporates a multiple cell vertical serpentine path, as well as a horizontal serpentine path, through the anoxic chamber. A fixed film media is mounted within each cell of the anoxic chamber to provide a structure on which the bacteria can grow to sustain the biological reaction, which convert nitrates into nitrogen gas. The fixed film media can be a cross-flow media and can optionally include a web of textile material integrated within the fixed film media to enhance bacterial growth within the fixed film media or optionally the anoxic vertical serpentine configuration could be applied to an activated sludge operation. A nitrate recycle pump recycles about 75% of the effluent from the aerobic chamber back into the anoxic chamber to provide a nitrate source for the digestion of the BOD within the influent wastewater.

16 Claims, 8 Drawing Sheets

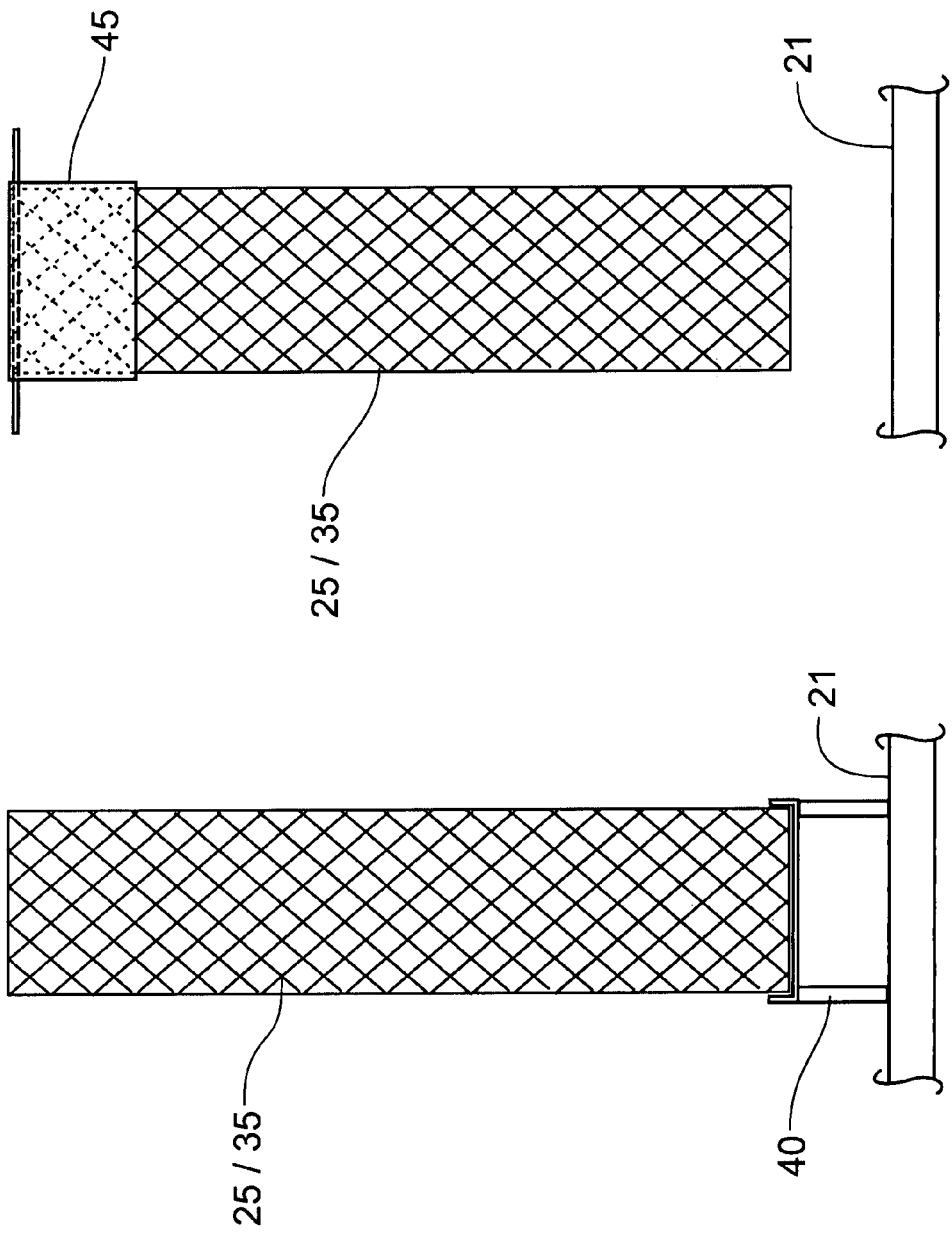

SUBMERGED FIXED FILM ANOXIC BIOREACTOR

FIELD OF THE INVENTION

The present invention generally relates to biological wastewater treatment systems that remove BOD and nitrogen contaminants from wastewater and, more particularly, to a critical-velocity vertical-serpentine anoxic reactor design that employs fixed-film media to support biological populations in contact with the wastewater while maintaining suspension of suspended bacteria and other particulates, without application of additional mechanical mixers.

BACKGROUND OF THE INVENTION

The treatment processes for municipal and industrial wastewater have evolved due to identification of harmful environmental conditions created by nitrogen rich wastewater treatment plant effluents in rivers and estuarian environments and subsequent and necessary regulatory changes required to protect the environment. Biochemical Oxygen Demand (BOD), ammonia-nitrogen, nitrite-nitrogen, nitrate-nitrogen and organic-nitrogen are now commonly restricted components of the effluents of wastewater treatment systems. Although biological wastewater treatment systems are routinely engineered to remove the BOD, ammonia-nitrogen and much of the organic-nitrogen from wastewater streams, in doing so, these wastewater treatment plants, known as nitrification systems, create a nitrate rich effluent that has been recognized as being harmful to some aquatic environments.

There are biological systems designed to remove the nitrate-nitrogen from nitrification system effluents and the process of biological nitrate-nitrogen removal is called de-nitrification. There are a variety of process configurations for de-nitrification and many of these may be incorporated directly within the conventional biological nitrification system. For example, in the most common approach to de-nitrification, the engineer establishes a de-nitrification reactor or reactors, also called an anoxic reactor(s) as the first reactor(s) in a series of separate reactors in which the latter reactors are operated aerobically with oxygen or air present with the intent to biologically oxidize the ammonia-nitrogen and organic-nitrogen to form nitrate-nitrogen. The first reactor is termed anoxic because no elemental oxygen or air containing oxygen is introduced for aeration or mixing in that reactor even though the anoxic reactor is also rich in organic matter because it receives the influent wastewater.

In the anoxic/aerobic reactor scheme described above the nitrate-nitrogen would exit the last tank to contaminate the environment and thus in processes with the anoxic/aerobic sequence, a large stream of the nitrified wastewater is pumped from the nitrification reactor back to the anoxic reactor where-in the nitrate-nitrogen is used as a source of nitrate-oxygen for facultative heterotrophic bacteria which use it processing the BOD of the incoming wastewater in the anoxic tank.

In the anoxic de-nitrification/aerobic nitrification process described above, a means of mixing the influent wastewater with the large recycled stream of nitrate rich water is critical to the effective contact of the mixture with the bacteria. Wherein the overall system is operating as an activated sludge system with suspended bacteria a mechanical mixing device is sufficient, albeit it requires more energy and capital investment. In some instances the series of reactors, both anoxic and aerobic, may use fixed-film biological populations that grow on surfaces fixed within the reactor vessel. Fixed-film systems do not lend them selves as easily to the application of mechanical mixers and again the additional cost for mixers and power are a factor in the economics of these anoxic/aerobic nitrification de-nitrification systems.

The typical anoxic/aerobic nitrification/de-nitrification system requires a 3:1 ratio of recycled nitrate rich water to influent wastewater to substantially reduce effluent nitrate concentration. At this ratio, a typical system can remove 70-75% of the available nitrates thus reducing the negative effects of nitrate-nitrogen on the receiving water systems. Increasing the recycle beyond the 3:1 ratio produces diminished returns because the effluent flow of the nitrification reactor will always contain nitrate-nitrogen at a concentration approximating that of the ammonia concentration entering the nitrification section. The nitrate removal effect is in fact created because the nitrate recycle stream, which does not contain ammonia at the end of the nitrification reactor, dilutes the influent ammonia concentration in and subsequently out of the de-nitrification reactor. The ammonia concentration of the liquid in the anoxic reactor does not vary greatly from the diluted concentration in the de-nitrification reactor but because it has already been diluted as it enters nitrification reactor, the nitrate-nitrogen concentration generated in the nitrification reactor is reduced.

The need to contact the nitrate rich final effluent wastewater with the bacteria in suspension or by forcing flow through the fixed media, or both, has always required the addition of mixing energy to the systems with mechanical devices, as is disclosed in U.S. Pat. No. 4,599,174, granted on Jul. 8, 1986, to Curtis S. McDowell, to maintain efficient contact between the wastewater and the biological fixed-film and/or to maintain the suspension of the facultative bacteria.

It would be desirable to provide a biological de-nitrification reactor that does not require additional mixers to maintain the required mixing of the wastewater and recycled nitrate stream and at the same time effectively contacts the mixture of these elements with the facultative bacteria. It would also be desirable to utilize the fluid flow and mixing energy provided by the nitrate recycle pumps to accomplish the required mixing of the influent wastewater and recycled nitrate stream and proper contact without requiring an additional input of mechanical energy or equipment.

SUMMARY OF THE INVENTION

It is an object of this invention to overcome the disadvantages of the prior art by providing a serpentine anoxic bioreactor having an anoxic chamber or series of chambers formed in an alternating up/down vertical serpentine path.

It is an object of this invention to provide an anoxic bioreactor that has fixed film media within each vertical path of the anoxic chamber.

It is a feature of this invention that a nitrate recycle pump directs a flow of liquid from the aerobic chamber into the anoxic chamber for mixture with the wastewater influent.

It is an advantage of this invention that the energy added to the liquid flow from the aerobic chamber by the nitrate recycle pump is the only energy needed to direct flow through the anoxic chamber.

It is another advantage of this invention that mixing energy is not needed in the anoxic chamber to keep suspended bacteria from settling to the bottom of the anoxic chamber.

It is a feature of this invention that the fixed film media within each cell of the anoxic chamber provides a structure on which bacteria can grow to perform the anoxic reactions to convert nitrates into nitrogen gases.

It is another feature of this invention that the effluent is pushed through the anoxic chambers by the energy added by the nitrate recycle pump with the effluent moving vertically up and down through the fixed film media.

It is still another advantage of this invention that the cells of the anoxic chamber are sized to maintain critical vertical velocities through the serpentine path defined by the anoxic chamber sufficient to maintain any biological solids in suspension.

It is a further advantage of this invention that the fixed film media can be formed as a cross-flow media that provides a non-linear flow path through the fixed film media.

It is a further feature of this invention that the fixed film media can be integrated with textile material within the structure of the media to enhance the ability of the bacteria to grow on the fixed film media.

It is still a further advantage of this invention that the energy inputted into the system by the nitrate recycle pump is operable to keep the solids in suspension within the effluent without the requirement of additional mixers within the anoxic chamber.

These and other objects, features and advantages are accomplished according to the instant invention by providing a constant velocity serpentine anoxic reactor that incorporates a multiple cell vertical serpentine path, as well as a horizontal serpentine path, through the anoxic chamber. A fixed film media is mounted within each cell of the anoxic chamber to provide a structure on which the bacteria can grow to sustain the biological reaction, which convert nitrates into nitrogen gas. The fixed film media can be a cross-flow media and can optionally include a web of textile material integrated within the fixed film media to enhance bacterial growth within the fixed film media or optionally the anoxic vertical serpentine configuration could be applied to an activated sludge operation. An air-lift pumping action through the fixed film towers in the aerobic chamber ensures contact of the wastewater with the media. A nitrate recycle pump recycles about 75% of the effluent back into the anoxic chamber to provide a nitrate source for the digestion of the BOD within the influent wastewater.

BRIEF DESCRIPTION OF THE DRAWINGS

The advantages of this invention will be apparent upon consideration of the following detailed disclosure of the invention, especially when taken in conjunction with the accompanying drawings wherein:

FIG. 7 is an elevational view of a fixed film media tower mounted on a stand to keep the fixed film media above the floor of the reactor;

FIG. 8 is an elevational view of a fixed film media tower mounted on a support chimney to maintain the fixed film media above the floor of the reactor.

DETAILED DESCRIPTION OF THE PREFERRED EMBODIMENT

Figure 1:
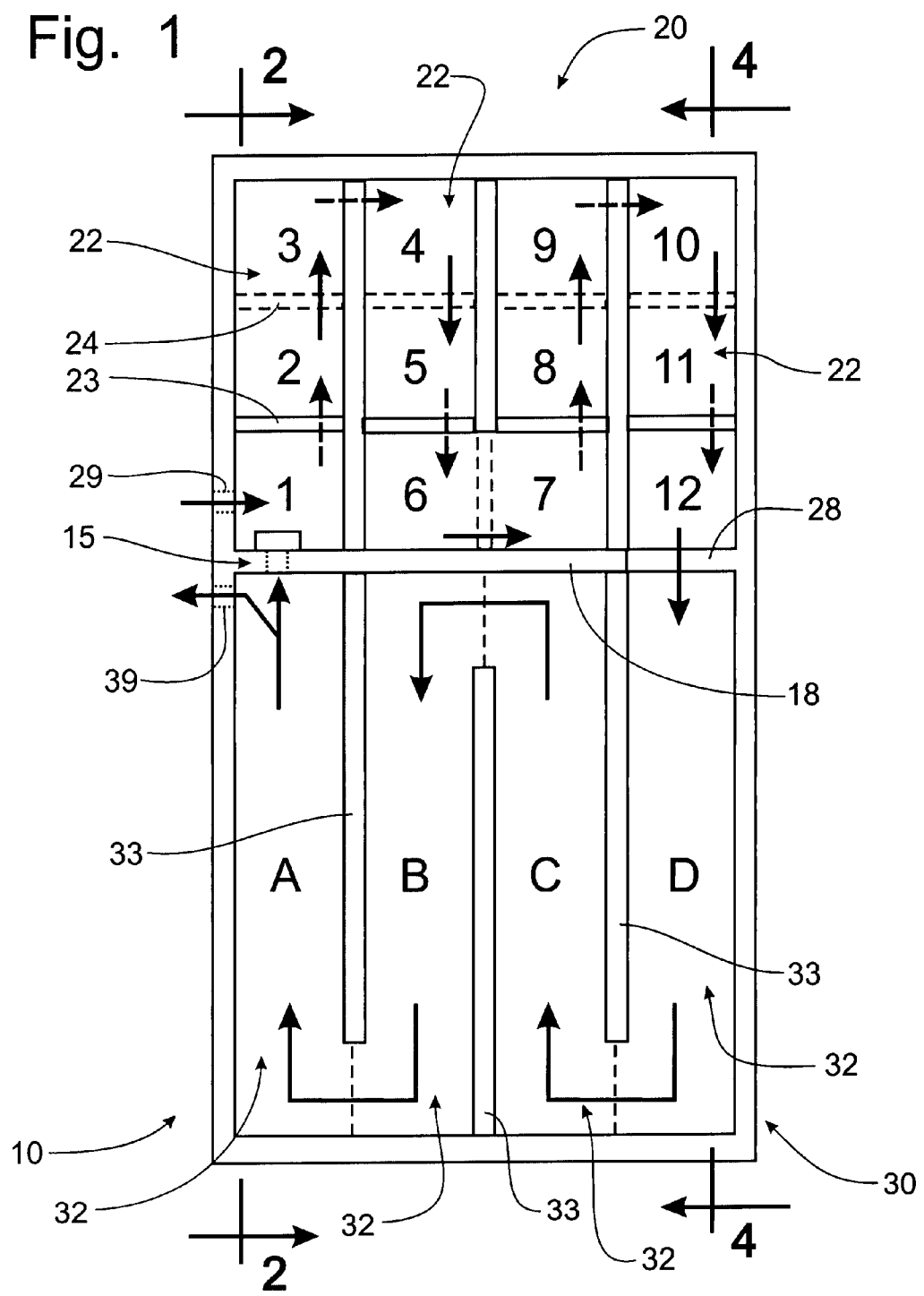
FIG. 1 is a top plan view of an anoxic bioreactor incorporating the principles of the instant invention, the horizontal serpentine flow paths being indicated with arrows.
Figure 2:
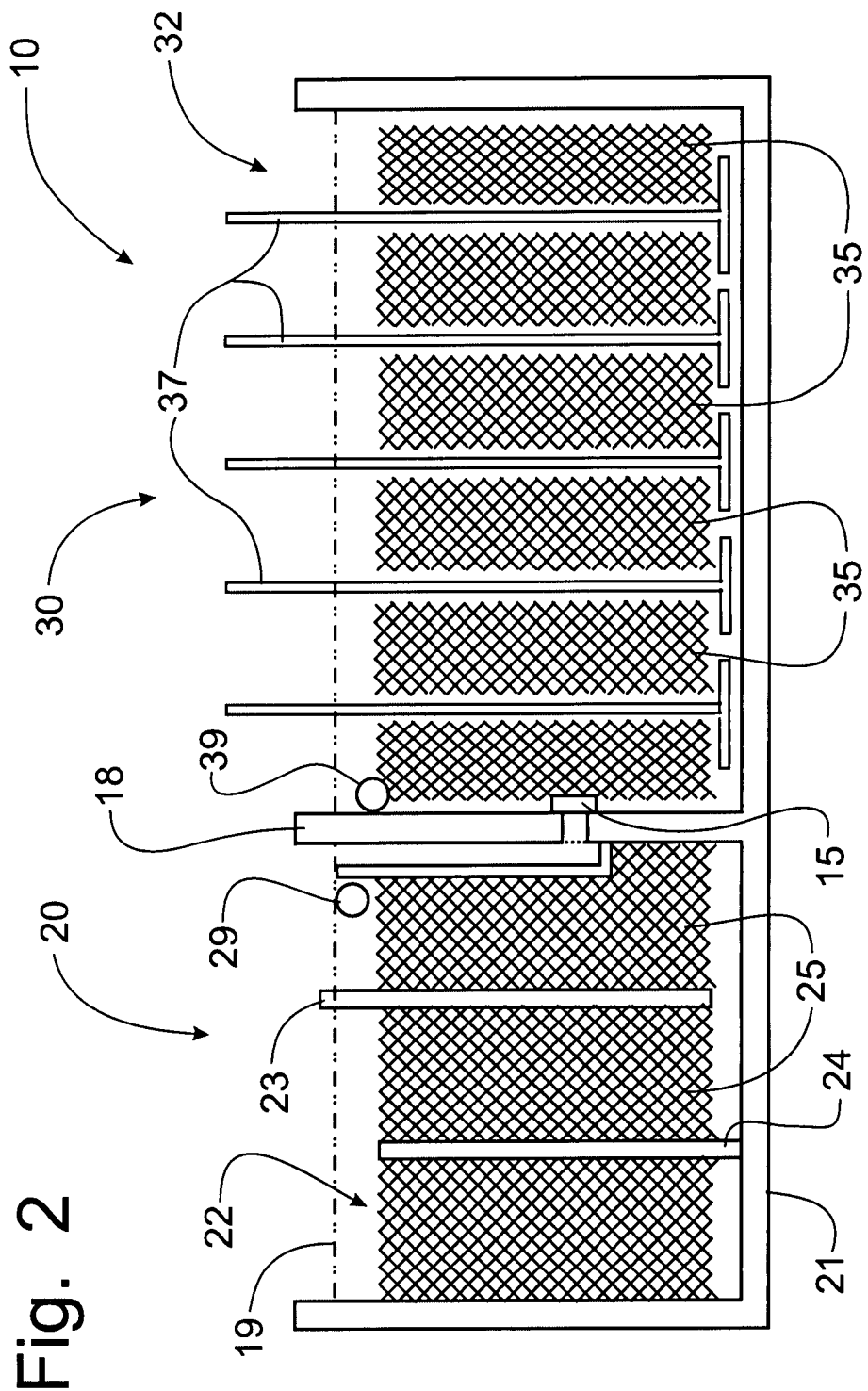
FIG. 2 is a schematic cross-sectional view through the anoxic bioreactor taken along lines 2-2 of FIG. 1.

Referring first to FIGS. 1-6, an anoxic bioreactor incorporating the principles of the instant invention can best be seen. The anoxic bioreactor 10 includes an anoxic chamber 20, which is the subject of this invention, that would typically be coupled to and an aerobic reactor chamber 30, although anoxic chamber 20 can be utilized as a stand alone system. When coupled to an aerobic chamber 30 as shown in FIG. 1, the influent enters the anoxic chamber 20 through an inlet 29 and immediately mixes with the treated effluent being discharged from the aerobic chamber 30, as will be described in greater detail below, via a recycle pump 15 which directs the nitrate rich aerobic chamber effluent into the anoxic chamber 20 for treatment of the influent wastewater. The anoxic chamber 20 includes a plurality of fixed film towers 25 that provide structure for the attachment and growth of facultative bacteria for the de-nitrification of the recycled effluent. Furthermore, and specific to this invention, the only energy input into the anoxic chamber 20 of the treatment system 10 is the energy provided by the recycle pump 15.

Figure 3:
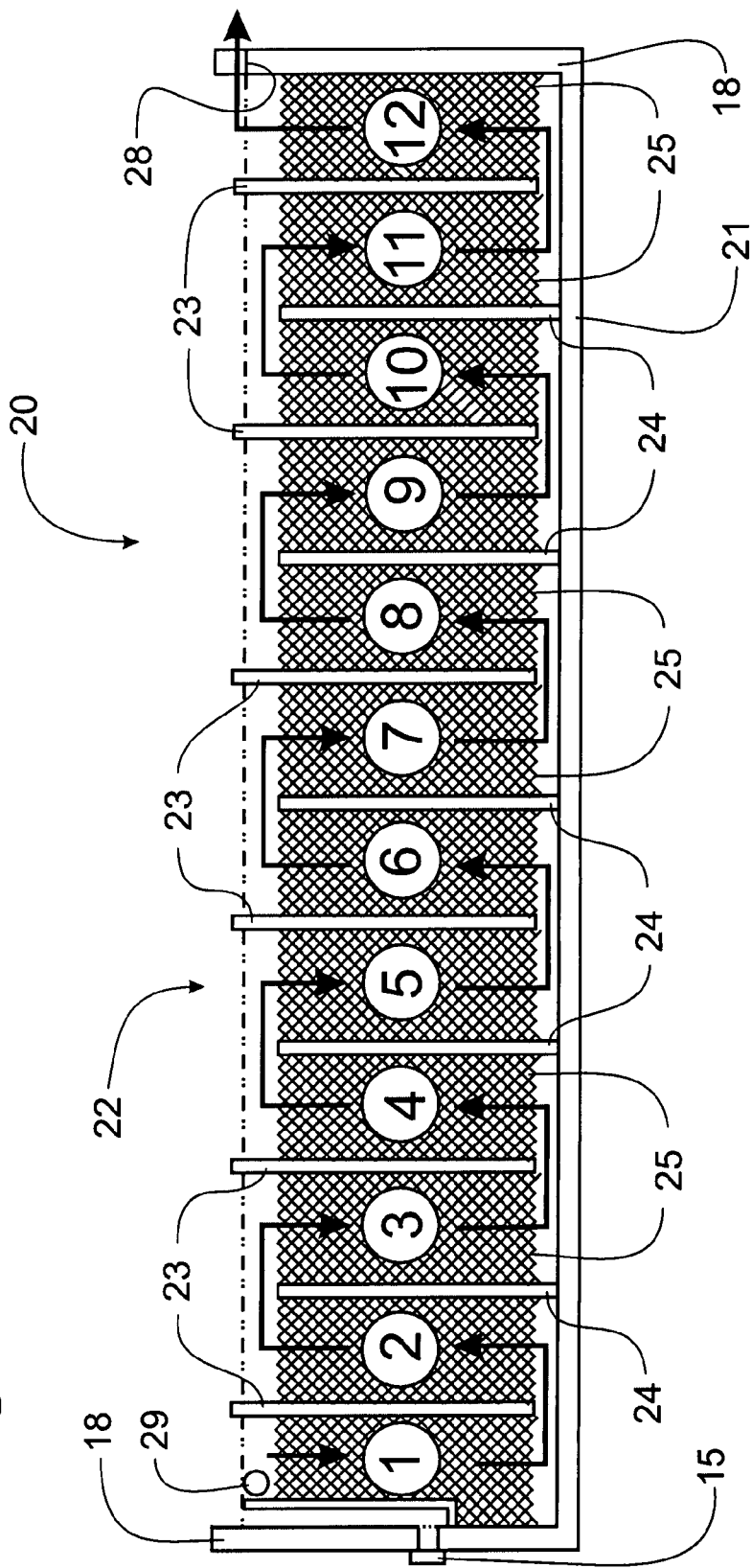
FIG. 3 is a schematic representation of the anoxic chamber expressed in a linear arrangement to reflect the vertical serpentine flow pattern represented by the arrows, the numbers of the individual cells corresponding to the cell numbers displayed in FIG. 1.

The disclosed bioreactor 10 incorporates multiple reactor cells 22 within the anoxic chamber 20 placed in flow communication in series with alternating vertical flow patterns, as is represented in FIG. 3. Preferably, the anoxic chamber 20 has an even number of individual reactor cells 22 so that the first cell 22, numbered 1 in FIGS. 1 and 3, has a vertically downward flow path forced by the divider wall 23 that is spaced from the floor 21 of the anoxic chamber 20 to allow the flow to pass horizontally under the divider wall 23 to reach the adjacent reactor cell numbered 2 in FIGS. 1 and 3. The divider wall 24 between reactor cells numbered 2 and 3 is lower than the divider wall 23, the top of the divider wall 24 being below the fluid level 29 within the anoxic chamber 20, to allow the flow to pass upwardly through the reactor cell numbered 2 and pass horizontally over the divider wall 24 into reactor cell 3.

Alternating the divider walls 23, 24 requires the flow path to follow a vertically serpentine path from one reactor cell 22 to the next reactor cell 22, with alternating vertical flow directions, until the last reactor cell 12 is reached. The discharge from the last reactor cell 12 is directed over a weir 28 in the wall 18 separating the anoxic chamber 20 from the aerobic chamber 30. The anoxic chamber 20 could be formed with an odd number of reactor cells 22 so long as the first cell is arranged to provide flow of the mixed influent and nitrate recycle through the first column 22 and the subsequent columns 22 in an alternating vertical serpentine flow path to the last reactor cell for discharge to the aerobic chamber 30. In an anoxic chamber having an odd number of reactor cells 22, the mixed influent and nitrate recycle could enter the bottom of the first reactor cell 22 to provide an upward flow path so that the last reactor cell 22 would have the discharge therefrom over the weir 28 in the wall 18. The juxtaposition of the anoxic chamber 20 to the aerobic chamber and the number of columns 22 therein is not limiting in this disclosure.

Each reactor cell 22 may or may not be filled with a tower 25 of fixed film media depending on whether the reactor system 10 is a fixed film reactor or a suspended solids reactor, as in an activated sludge process. In a fixed film reactor system wherein each cell 22 is filled with fixed film media such that the effluent flow must pass through the fixed film tower 25 to pass into the adjacent reactor cell 22, the fixed film media is preferably cross-flow media formed by a plurality of sheets of fixed film connected together to form interconnected diagonal paths within the media that force the effluent to move throughout the fixed film tower 25. A straight vertical flow path formed by the fixed film media will work also. As an example, fixed film media comprising individual sheets of formed film interconnected to form a tower is disclosed in U.S. Pat. No. 6,544,628, issued on Apr. 8, 2003, to Richard J. Aull, et al and assigned to Brentwood Industries, Inc. Such fixed film media would work properly within each reactor cell to provide a structure that will facilitate the growth of the facultative bacteria as the effluent passes through the tower 25 to move to the adjacent reactor cell 22.

The opening at the bottom of the divider walls 23, through which the effluent passes into the adjacent reactor cell 22, is sized so that the average system design flow will result in a liquid velocity of one foot/second through the opening. This velocity of one foot/second is recognized as being sufficient to scour suspended biological solids from the floor 21 of the reactor chamber 20 and is the recommended velocity for suspension of such solids in an activated sludge system. The floor 21 is depicted in the drawings as being generally planar. An alternate configuration would be for the floor of each reactor cell 22 to slope toward the opening in the divider wall 23. In other words, the floor of the odd numbered reactor cells 22 having a downward flow path would slope downwardly toward the opening under the wall 23, while the adjacent reactor cell 22 having an upward flow path would slope upwardly away from the opening under the divider wall 23. The presence of a sloped floor configuration will increase the velocity of the effluent over the floor 21. The sloped floor will also promote a uniform down flow velocity through the cross-sectional area of the reactor cell 22, as the effluent exiting the vertical column near the inlet wall will make the 90 degree turn and flow through a smaller vertical cross-sectional area than the effluent flowing form the middle of the vertical column or the effluent flowing downward at the dividing wall 24.

Figure 4:
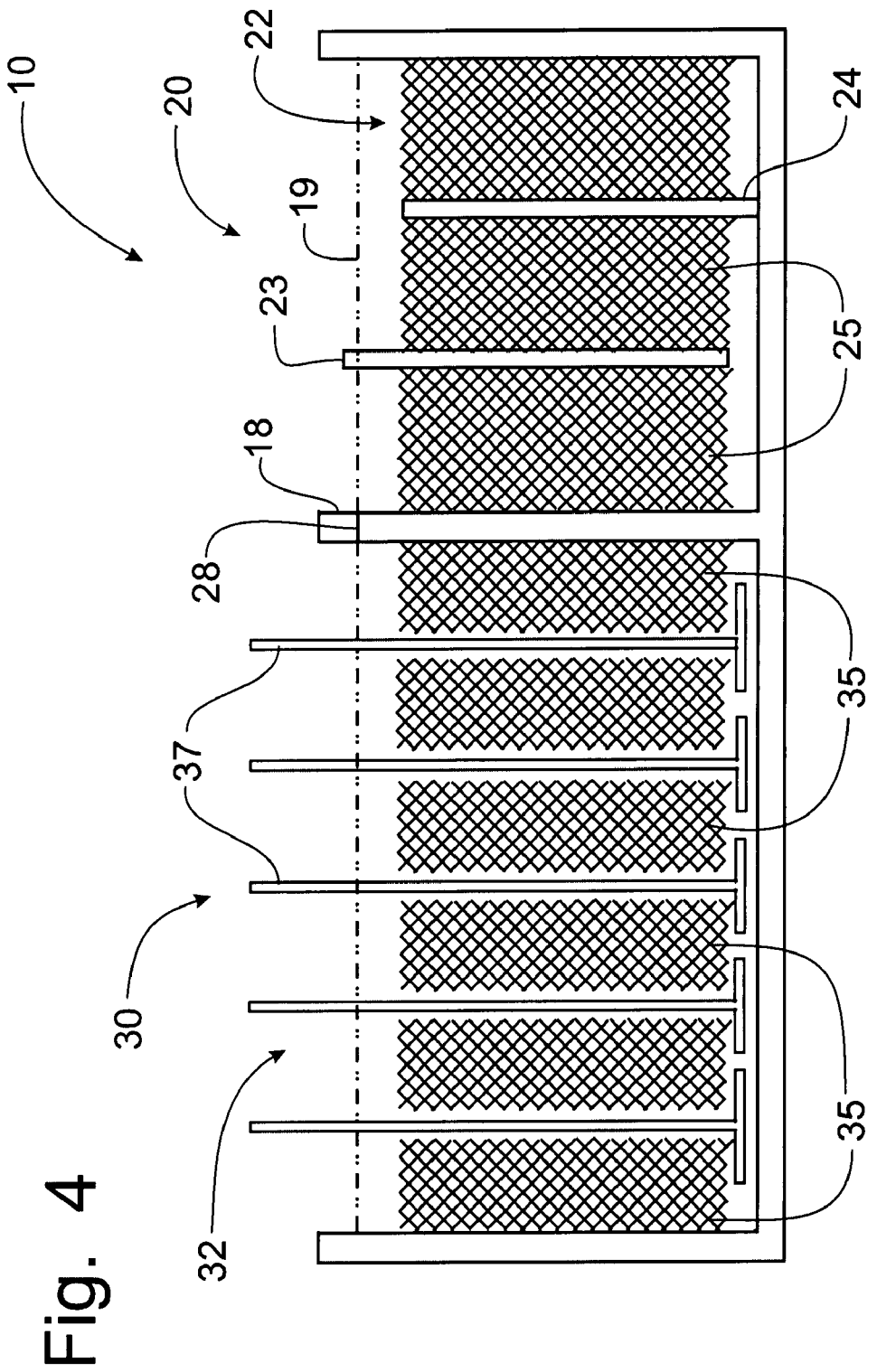
FIG. 4 is a schematic cross-sectional view through the anoxic bioreactor taken along lines 4-4 of FIG. 1.
Figure 5:
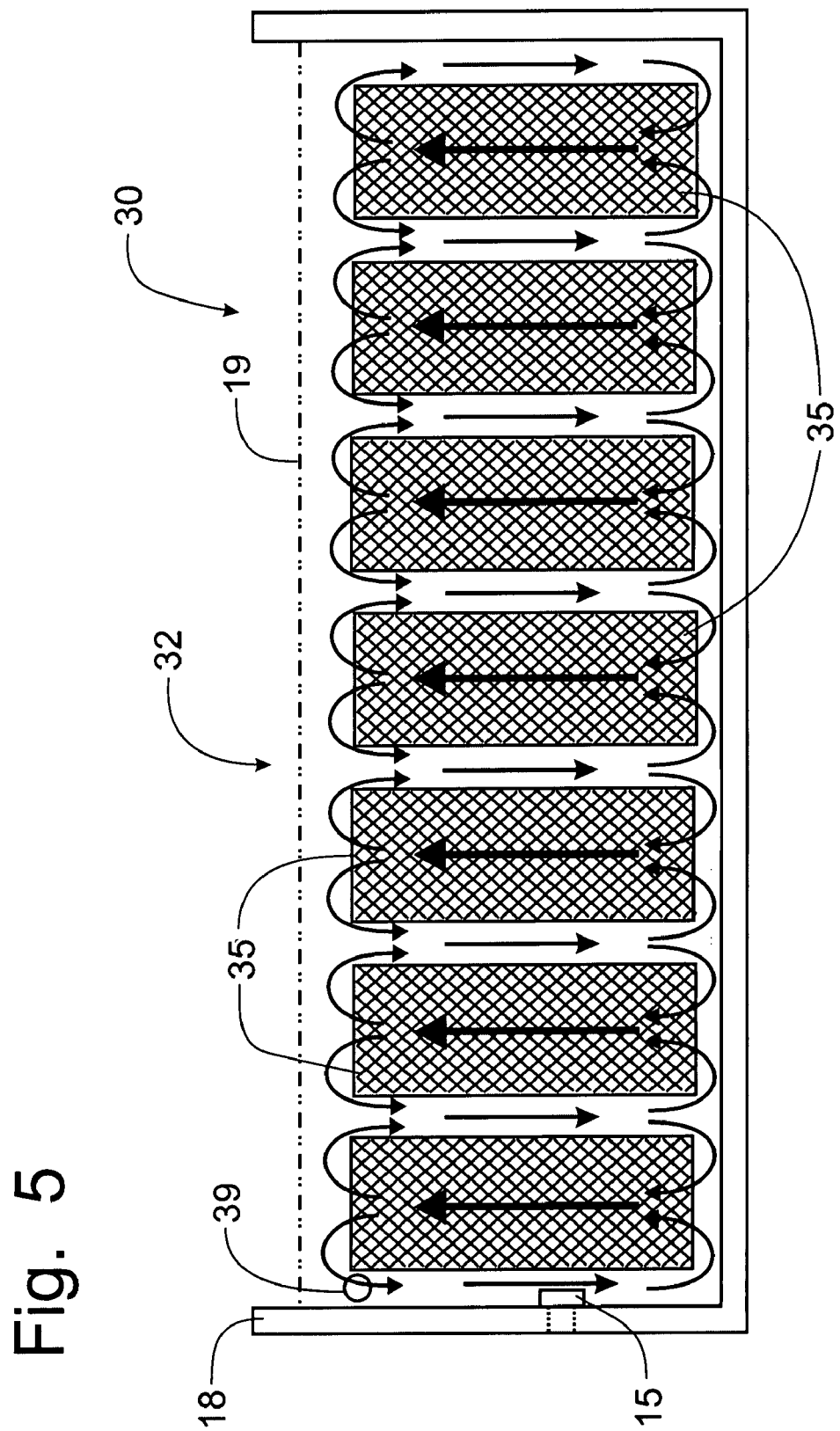
FIG. 5 is a schematic representation of an individual cell of the aerobic chamber to reflect the vertical serpentine flow pattern represented by the arrows.

The plan view area of each reactor cell 22, is critical to design of the anoxic chamber 20. The upward velocity of the effluent moving through the even numbered reactor cells, as depicted in FIG. 4, is the most critical design factor in creating the multiple cell serpentine anoxic reactor 20. The cross-sectional area of the reactor cell 22 having an upward flow path must be such that the rise velocity in these even numbered reactor cells 22 is greater than 30 ft/hr. (or 0.5 ft/min). At this velocity, solids will be kept entrained in the upward flow within the matrix of the fixed film tower 25. Thus, the surface area of the even numbered reactor cells 22 is defined by the need to achieve the proper upward flow velocity, given the volume of effluent passing through the reactor cells 22. The rise velocity must be sufficient to exceed the settling velocity of the majority of particles suspended in the effluent and/or those particles that slough off the fixed film media within the reactor cells 22. In addition, the use of cross-flow fixed film media in the tower 25 will create turbulence as the effluent flows through the cross-flow media, reducing the boundary layer in the manner of a static mixer aiding in this process.

Figure 9:
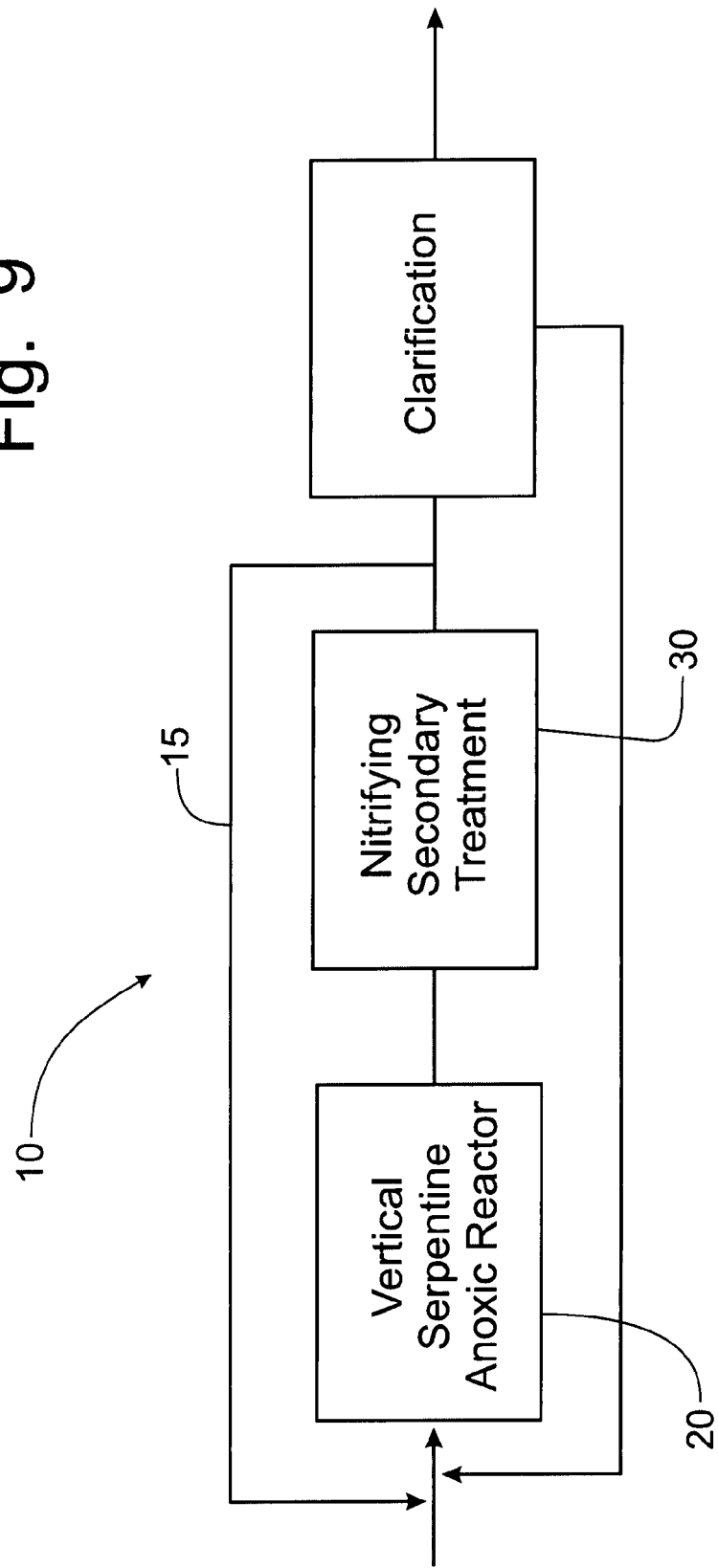
FIG. 9 is a process flow diagram showing the incorporation of the principles of the instant invention into a conventional treatment system.

The disclosed process, can be defined as a critical velocity serpentine anoxic reactor, and can be incorporated into conventional treatment systems in many different ways. The process flow diagram of FIG. 9 depicts one way in which the anoxic reactor 20 is incorporated into an activated sludge treatment system wherein full conversion of ammonia and degradable organic nitrogen to nitrate is assumed to occur through the nitrifying secondary treatment system, as will be described in greater detail below. The nitrifying secondary treatment system downstream of the anoxic chamber 20 could be an activated sludge system (shown), a trickling filter, a rotating biological disk system, a moving bed bioreactor or other effective nitrification bioreactor system.

The movement of the fully nitrified effluent from the secondary treatment system, i.e. the aerobic chamber 30, as described in greater detail below, is normally transferred to the anoxic chamber 20 by centrifugal pumps 15 or other known pumping devices. This movement of the nitrate rich effluent recycled from the aerobic chamber 30 to the front of the anoxic reactor 20 requires the input of energy. This energy is sufficient in the anoxic chamber 20 to keep the solids in suspension without the requirement of supplemental mixers in the anoxic chamber 20. Accordingly, the energy provided to the anoxic chamber 20 by the recycle pumps 15 is the only energy required to maintain solids suspension in the entire anoxic chamber 20 and to discharge denitrified effluent into the aerobic chamber 30.

The volume of the anoxic chamber 20 is determined by the stoicheometry of the nitrate removal process and/or a minimum hydraulic retention time sufficient to allow the facultative bacteria to extract the nitrate from the effluent under BOD rich conditions. If sufficient BOD is not naturally present in the feed stream, a supplemental BOD source such as sugars from industrial waste generators, methanol or acetate can be used to accelerate the biological conversion of the nitrates into nitrogen gas. In an aerobic bioreactor, the rate of oxygen consumption for very food rich conditions may approach 30 to 45 mg $O_2$/L-hr. If nitrate supplies the equivalent of 2.85 mgs of oxygen per ppm of nitrate-nitrogen removed, then the nitrate removal rate could be about 10.5 to 15.8 mg $NO_3$-/L-hr. Accordingly, the volume of the reactor per pound of nitrate-nitrogen/day to be removed would thus range from 475 gallons to 316 gallons. The volume of the anoxic chamber 20 can thus be determined once the amount of nitrate to be removed has been established and hence the hydraulic detention time determined. However, because of the large volume of nitrate recycle, usually 300% of the influent flow, it is common to specify a minimum hydraulic retention time of one hour in the anoxic chamber based on total flow if the hydraulic retention time based on the anoxic chamber volume required to remove the indicated pounds of nitrate, does not equal at least one hour.

Further, consideration must be given to the residual dissolved oxygen (DO) returning with the recycle effluent stream, as this dissolved oxygen consumes additional BOD before de-nitrification can take place. The DO at the back of the secondary system, the aerobic chamber 30, can approach 6-7 ppm. This oxygen is returned with the nitrate recycle effluent into the anoxic chamber 20. Since the facultative bacteria will consume the DO before the bacteria will consume nitrates, the size of the anoxic chamber 20 must incorporate sufficient volume to allow the excess DO to be consumed via the biological process. The DO must be reduced to near zero to allow for anoxic conditions before conversion of the nitrate to nitrogen gas can occur. Accordingly, for every pound of oxygen returned to the front of the anoxic chamber 20, the volume of the anoxic chamber 20 must be increased by as much as 167 gallons.

Figure 6:
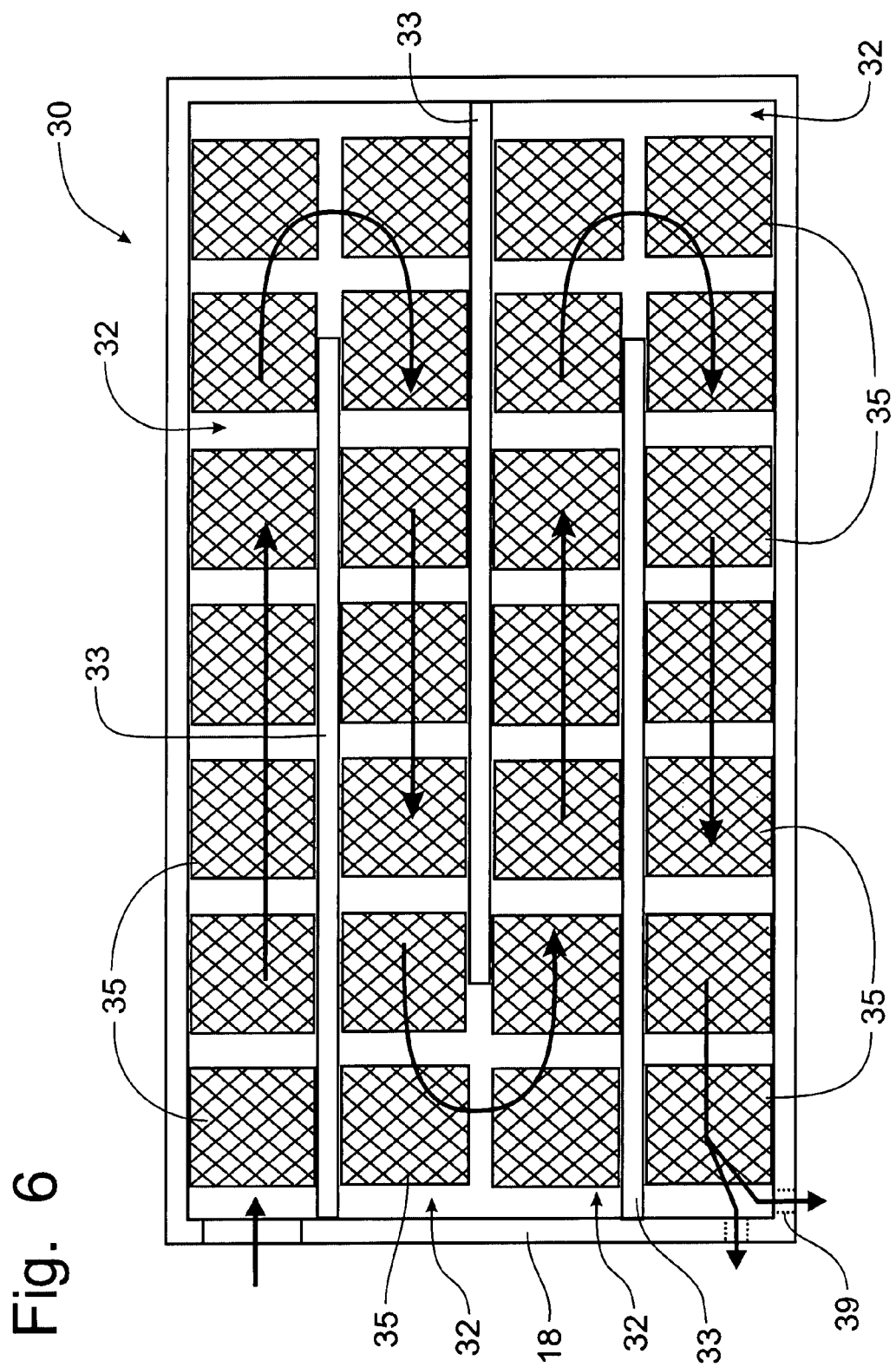
FIG. 6 is an enlarged top plan view of the aerobic chamber to reflect the horizontal serpentine flow pattern represented by the arrows.

Once the anoxic chamber 20 discharges the denitrified effluent over the weir 28 into the aerobic chamber 30 described in the attached figures, or into another specified aerobic biological process, the conversion of ammonia into nitrates will occur. The nature of the nitrification aerobic process following is not limited to a fixed film process nor is the process described in the Figures in this disclosure a part of this invention. A known example of the aerobic chamber 30 is divided into a horizontal serpentine flow path by divider walls 33, creating, preferably, four linear aerobic cells 32, as is depicted in FIG. 6. Each aerobic cell 32 is provided with a plurality of spaced apart towers 35 of fixed film media, preferably the cross-flow type of media. An air supply is bubbled up through each tower 35 by an air supply member 37 to create an air-lift pumping action, as is represented by the arrows in FIG. 5. The injection of air into the towers 35 decreases the density of the effluent within the tower 35 causing the effluent to rise, pushing the effluent down between the adjacent towers 35 where the downwardly flowing effluent enters the bottom of the tower to be aerated. With effluent moving from one tower 35 to the next adjacent downstream tower 35 through the aerobic cells 32, and with the energy inputted by the recycle pump 15, the effluent moves from one tower 35 to another through the aerobic chamber 30 from one aerobic cell 32 to another until reaching the end of the last aerobic cell D.

At the end of the aerobic chamber 30, the recycle pump moves about 75% of the now nitrate rich effluent and inserts the recycled effluent into the front of the anoxic chamber 20, as is described above. The remaining effluent is discharged from the reactor 10 through the outlet opening 39. The discharge rate will be substantially equal to the inflow rate of the influent inputted through the inlet opening 29.

As is represented in FIGS. 7 and 8, the fixed film media towers can be supported on a stand 40 that is mounted on the floor 21 of the reactor 10 to keep the bottom of the fixed film tower 25, 35 off the floor 21. Alternatively, the fixed film tower 25, 35 can be mounted in a chimney 45 and suspended therefrom. The chimney 45 is preferably supported by the adjacent divider or separator walls, while the fixed film media tower 25, 35 is hung from the chimney 45 so that the bottom of the tower 25, 35 is spaced above the floor 21 of the reactor 10.

In operation, the BOD rich influent arriving through the inlet opening 29 is mixed with the recycle effluent which is rich in nitrates. After the dissolved oxygen from the recycled effluent is dissipated, the organic food source of the BOD material, primarily a carbon source, is converted by the facultative bacteria growing on the fixed film media towers 25 into ammonia, which is largely dissolved within the effluent, and nitrogen which is discharged to the atmosphere. The vertical and horizontal serpentine paths created by the anoxic chamber 20 through the towers 25 of fixed film media provide adequate time for the conversion of the nitrates into ammonia and expelled gases and new bacterial growth.

When the ammonia rich effluent is discharged over the weir 28 in the wall 18, the oxygenation of the effluent within the aerobic towers 35 convert the ammonia into first nitrites and then nitrates, and water. Thus, the effluent in the aerobic chamber 30 re-nitrifies the effluent so that the recycle pumps 15 can recycle the converted nitrate rich recycle effluent back into the anoxic chamber 20. Meanwhile, the BOD is substantially exhausted from the effluent. The remaining nitrates in the effluent discharged from the reactor 10 through the outlet opening 39 can be treated subsequently by known de-nitrification processes before being discharged to the environment.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the invention.

Having thus described the invention, what is claimed is:

1. A wastewater treatment apparatus including a tank having a floor and defining an inlet for the introduction of wastewater and a nitrate rich water into the tank, said wastewater containing BOD to be removed therefrom, and an outlet for the discharge of treated wastewater from said tank, said tank having a fluid level defining a top surface of said wastewater within said tank, comprising:

an anoxic chamber configured to have a vertical rise velocity of at least approximately 30 feet per hour, said anoxic chamber in flow communication with said inlet to receive said wastewater and said nitrate rich water, said anoxic chamber being divided into a plurality of reactor cells arranged in series to define alternating vertical flow paths through succeeding reactor cells from a first reactor cell in flow communication with said inlet, said wastewater and said nitrate rich water being mixed together within said first reactor cell, to a last reactor cell having a discharge of said treated wastewater therefrom, said alternating vertical flow paths defining a vertical serpentine flow path through said anoxic chamber.

2. The wastewater treatment apparatus of claim 1 wherein said reactor cells in said anoxic chamber are separated alternately by first and second divider walls, said first divider walls extending above said fluid level but terminating above said floor to define an opening below each said first divider wall for the flow of wastewater between adjacent reactor cells, said second divider walls extending upwardly from said floor to prevent the flow of wastewater below said second divider walls, but terminating below said fluid level to permit the flow of wastewater over top of said second divider walls into the adjoining reactor cells.

3. The wastewater treatment apparatus of claim 2 wherein said reactor cells are arranged to define a horizontal anoxic serpentine path in addition to said vertical serpentine path for the flow of wastewater through said anoxic chamber.

4. The wastewater treatment apparatus of claim 3 wherein said each said reactor cell is provided with a fixed film media tower that substantially fills each said reactor cell.

5. The wastewater treatment apparatus of claim 4 wherein each said fixed film media tower is suspended above said floor and below said fluid level.

6. The wastewater treatment apparatus of claim 5 wherein said nitrate rich water is discharged from a companion aerobic wastewater treatment system having a recycle pump operable to divert said nitrate rich water into said first reactor cell.

7. The wastewater treatment apparatus of claim 6 wherein each said anoxic cell has a cross-sectional area corresponding to a horizontal plane taken through said anoxic cell, said cross-sectional area being sized in proportion to the total flow of said wastewater and said nitrate rich water to maintain a minimum critical velocity of said wastewater through said anoxic chamber.

8. The wastewater treatment apparatus of claim 7 wherein said recycle pump is the only source of energy added to said apparatus to move wastewater through said anoxic chamber.

9. The wastewater treatment apparatus of claim 7 wherein said minimum critical velocity is measured at the bottom of said first divider walls relative to the velocity of said wastewater moving along said floor of said tank.

10. The wastewater treatment apparatus of claim 7 wherein said anoxic chamber includes an even number of reactor cells, said first reactor cell having said inlet near a top portion of said first reactor cell, said discharge being a weir on said last reactor cell.

11. A wastewater treatment facility including a vessel having a floor and defining an inlet for the introduction of an influent into the vessel, said influent containing BOD and ammonia to be removed therefrom, and an outlet for the discharge of treated effluent from said vessel, said vessel having a fluid level defining a top surface of said effluent within said vessel, comprising:

an anoxic de-nitrification chamber configured to have a vertical rise velocity of at least approximately 30 feet per hour, said anoxic de-nitrification chamber defining a flow path from said inlet to a discharge, said flow path having fixed film media suspended within said anoxic chamber such that said flow path passes through said fixed film media to provide structure for the growth of bacteria along said flow path, said anoxic chamber being divided into a plurality of reactor cells arranged in series to define alternating vertical flow paths through succeeding reactor cells from a first reactor cell in flow communication with said inlet to a last reactor cell including an outlet, said alternating vertical flow paths defining a vertical serpentine flow path through said anoxic chamber;

an aerobic chamber positioned to receive de-nitrified effluent from said outlet of said anoxic de-nitrification chamber, said aerobic chamber having a plurality of fixed film media towers spaced along a horizontal serpentine flow path through said aerobic chamber, each said tower having a stream of air flowing through said fixed film media to aerated said de-nitrified effluent, said aerobic chamber having said outlet located at a remote end of said horizontal serpentine flow path from said discharge of said aerobic chamber; and a recycle apparatus located at said remote end of said horizontal serpentine flow path to divert a portion of said aerated effluent into said anoxic chamber to be mixed with said influent.

12. The wastewater treatment facility of claim 11 wherein said recycle apparatus includes a recycle pump that is the only source of energy for moving effluent through said anoxic chamber.

13. The wastewater treatment facility of claim 11 wherein said reactor cells in said anoxic chamber are separated alternately by first and second divider walls, said first divider walls extending above said fluid level but terminating above said floor to define an opening below each said first divider wall for the flow of effluent between adjacent reactor cells, said second divider walls extending upwardly from said floor to prevent the flow of effluent below said second divider walls, but terminating below said fluid level to permit the flow of effluent over top of said second divider walls into the adjoining reactor cells.

14. The wastewater treatment facility of claim 11 wherein each said reactor cell has a cross-sectional area corresponding to a horizontal plane taken through said reactor cell, said cross-sectional area being sized in proportion to the volume of said effluent passing through said anoxic chamber to maintain a minimum critical vertical rise velocity of said effluent through each said reactor cell.

15. The wastewater treatment facility of claim 11 wherein each said reactor cell has an opening with a cross-sectional area corresponding to a vertical plane taken through said reactor cell wall, said cross-sectional area being sized in proportion to the volume of said effluent passing through said anoxic chamber to maintain a minimum critical velocity of said effluent across said vessel floor.

16. The wastewater treatment facility of claim 11 wherein said each said reactor cell is provided with a fixed film media tower that has a horizontal cross-sectional area substantially equal to the cross-sectional area of said reactor cell.

* * * * *